(12) United States Patent
Kwon et al.

(10) Patent No.: US 8,532,040 B2
(45) Date of Patent: Sep. 10, 2013

(54) METHOD FOR RANDOM ACCESS BASED ON PRIORITY

(75) Inventors: Yeong Hyeon Kwon, Anyang-si (KR); Min Seok Hon, Anyang-si (KR); Sung Ho Moon, Anyang-si (KR); Hong Won Park, Anyang-si (KR); Jin Sam Kwak, Anyang-si (KR); Hyun Woo Lee, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 12/741,888

(22) PCT Filed: Nov. 12, 2008

(86) PCT No.: PCT/KR2008/006663
§ 371 (c)(1),
(2), (4) Date: May 7, 2010

(87) PCT Pub. No.: WO2009/064109
PCT Pub. Date: May 22, 2009

(65) Prior Publication Data
US 2010/0227636 A1  Sep. 9, 2010

Related U.S. Application Data

(60) Provisional application No. 60/988,090, filed on Nov. 14, 2007.

(30) Foreign Application Priority Data

Jan. 29, 2008  (KR) ........................ 10-2008-0009156

(51) Int. Cl.
*H04W 4/00* (2009.01)
*H04B 7/216* (2006.01)
*H04B 7/212* (2006.01)
*H04M 11/04* (2006.01)
*H04B 7/00* (2006.01)

(52) U.S. Cl.
USPC ........... 370/329; 370/330; 370/342; 370/348; 455/435.3; 455/404.1; 455/521

(58) Field of Classification Search
USPC ................. 370/329, 330, 342, 343, 346, 348; 455/436, 435.3, 435.1, 404.1, 521
See application file for complete search history.

(56) References Cited

U.S. PATENT DOCUMENTS

2001/0026539 A1* 10/2001 Kornprobst et al. .......... 370/329
2001/0036113 A1* 11/2001 Jurgensen et al. ............ 365/200

(Continued)

FOREIGN PATENT DOCUMENTS

WO  WO 2007/029977 A1  3/2007

*Primary Examiner* — Awet Haile
(74) *Attorney, Agent, or Firm* — McKenna Long & Aldridge LLP

(57) ABSTRACT

A random access method based on priority is disclosed. A priority-based random access method for use in a random access method supporting emergency communication including selecting, by a user equipment (UE), a random access slot corresponding to priority of the UE, among several random access slots to which at least two priorities are allocated, selecting an arbitrary sequence by the UE, and transferring the selected sequence to a base station via the selected random access slot. The method minimizes a UE access delay time requesting emergency communication by assigning priority to resources, and is able to reduce an amount of wasted resources by effectively distributing resources to not only a high-priority UE but also a low-priority UE according to individual situations.

7 Claims, 6 Drawing Sheets

(56) References Cited

U.S. PATENT DOCUMENTS

2006/0105772 A1    5/2006  Khawand et al.
2006/0126570 A1    6/2006  Kim et al.
2007/0121545 A1*   5/2007  Park et al. .................... 370/329
2007/0291696 A1*  12/2007  Zhang et al. .................. 370/331
2008/0043658 A1*   2/2008  Worrall ......................... 370/312
2008/0101313 A1*   5/2008  Choi et al. ..................... 370/342
2009/0023453 A1*   1/2009  Hu et al. ...................... 455/452.1

* cited by examiner

METHOD FOR RANDOM ACCESS BASED ON PRIORITY

This application is a national phase application based on International Application No. PCT/KR2008/006663, filed on Nov. 12, 2008, which claims priority to U.S. Provisional Application No. 60/988,090, filed on Nov. 14, 2007 and Korean Patent Application No. 10-2008-0009156, filed on Jan. 29, 2008, all of which are incorporated by reference for all purposes as if fully set forth herein.

TECHNICAL FIELD

The present invention relates to a random access scheme, and more particularly to a priority-based random access method for reducing a UE access delay time requesting emergency communication, and preventing resources from being wasted.

BACKGROUND ART

Generally, an amount of communication traffic rapidly increases in a natural disaster or artificial disaster, such that a user, who meets with misfortune, has difficulty in connecting his or her urgent call such as an emergency rescue call. Specifically, in order to support a communication mode for emergency rescue in the next generation communication system, E-911 and requirements are being reflected in this next generation communication system. The above-mentioned requirements enable resources to be properly maintained in a range from the beginning of a communication mode to its maintenance status, and implement a priority-based communication processing, thereby supporting high-priority communication such as an emergency rescue call. In order to support the emergency rescue communication, a variety of methods should be applied to a communication system, for example, allocation of priority to an emergency call, reservation of radio resources, and a preemptive access to a call path.

Generally, at the beginning of communication, system information is obtained from a downlink channel, a UE access is carried out according to predetermined system parameters, and a system allows registration/access of a call control according to a UE performance, such that a communication mode can be maintained. A user multiplexing is required for a cellular network, such that the UE is able to the initial uplink without conducting uplink synchronization in only a specific time interval. This channel is called a random access channel, the UE generally transmits signals to this random access channel, and a base station (BS) estimates an uplink timing error, such that a timing advance can be provided to the UE. This random access channel has been generally designed irrespective of a UE type or call priority. So, the UE access is abruptly carried out if any emergency situation occurs, resulting in the occurrence of congestion. Therefore, under the condition that the base station (BS) is unable to recognize which one of UEs has higher priority, the base station (BS) has to conduct the call control. As a result, the base station (BS) must assign priority to only a UE of a successful initial access in such a way that communication between the base station (BS) and the UE is conducted.

The random access channel of a conventional system is adapted to reserve logical or physical resources of the system, and the UE transmits a specific sequence via the reserved resources. In this case, the above-mentioned UE access can be classified into a UE pre-access in which the UE has previously accessed the system and a UE initial access.

If the UE has previously accessed the system, it updates conventional timing advance information over the random access channel, and transmits information of a channel status. A corresponding UE transmits a corresponding sequence at a specific time (e.g., a time decided by the UE and a time decided by a base station).

In case of the initial access, the UE directly accesses the random access channel without any limitation or indication, and selects a predetermined sequence to be used for the corresponding random access channel. In this case, if the UE detects a sequence transferred from the UE, it transmits additional operation information to a downlink. If the UE monitoring a downlink channel receives information corresponding to the sequence which has been transferred from the UE itself, it gains access to the system according to the corresponding information. Otherwise, if there is no response during a predetermined time, the UE performs a backoff during a predetermined time, and modifies a combination of power/random access channel/sequence, such that it re-attempts to access the random access channel. The above-mentioned process can also be carried out in a handoff process.

The above-mentioned process has no problems under small amount of load. However, provided that the system is overloaded, the number of reattempts of UEs increases, such that a ranging channel must unavoidably undergo congestion. That is, the number of collisions between UEs increases, and an interference level between signals also increases. Therefore, a system access time of the UE may be delayed, such that it is contrary to the order of call setup steps in an emergency situation.

Therefore, conventionally, a random access channel under an emergency situation is designed to be operated in the same manner as in ordinary cases, such that it is unable to support communication based on priority (i.e., priority-based communication).

DISCLOSURE

Technical Problem

Under emergency or disaster situations, a communication system for a disaster situation may frequently generate an occasion phenomenon due to a rapid increase of call load. Under this congestion, if emergency communication is needed and a priority scheme is not applied to this emergency communication, the beginning of this communication and a call connection state cannot be carried out. Therefore, a high-priority user equipment (UE), which has to enter a communication mode for emergency measures, must preemptively access a system, irrespective of system load.

An object of the present invention is to provide a method a priority-based random access method for an initial communication step under an emergency situation.

Technical Solution

To achieve these objects and other advantages and in accordance with the purpose of the invention, as embodied and broadly described herein, a priority-based random access method for use in a random access method supporting emergency communication comprises: selecting, by a user equipment (UE), a random access slot corresponding to priority of the UE, among several random access slots to which at least two priorities are allocated; selecting an arbitrary sequence by the UE; and transferring the selected sequence to a base station via the selected random access slot.

The selecting of the random access slot may include: selecting a random access slot which has higher priority in proportion to the UE priority.

The selecting of the random access slot may include: selecting a random access slot having priority lower than the UE priority, if the random access slot corresponding to the UE priority is selected by another UE.

The several random access slots may have a preamble repetition structure.

In another aspect of the present invention, there is provided a priority-based random access method for use in a random access method supporting emergency communication including: selecting, by a UE, an arbitrary random access slot among several random access slots; selecting random access sequences corresponding to priority of the UE, among several random access slots to which at least two priorities are allocated; and transferring the selected sequences to a base station via the selected random access slot.

The selecting of the random access sequences may include: selecting random access sequences which have higher priority in proportion to the UE priority.

The selecting of the random access sequences may include: selecting random access sequences having priority lower than the UE priority, if random access sequences corresponding to the UE priority are selected by another UE.

The priority information allocated to the random access sequences may be stored as an initial value in the UE.

The several random access slots may have a preamble repetition structure.

In another aspect of the present invention, there is provided a priority-based random access method for use in a random access method supporting emergency communication including: selecting, by a UE, a random access slot corresponding to priority of the UE and a probability of accessing several random access slots to which at least two priorities are allocated; selecting an arbitrary sequence by the UE; and transferring the selected sequence to a base station via the selected random access slot.

The selecting of the random access slot may include: receiving information of the access probability of the random access slots from the base station.

The selecting of the random access slot may include: receiving load information of a system from the base station; and selecting a random access slot having priority higher than the UE priority using a probability which is in inverse proportion to the system load.

In another aspect of the present invention, there is provided a priority-based random access method for use in a random access method supporting emergency communication including: selecting, by a UE, an arbitrary random access slot among several random access slots; selecting random access sequences corresponding to priority of the UE and a probability of accessing several random access slots to which at least two priorities are allocated; and transferring the selected sequences to a base station via the selected random access slot.

The selecting of the random access sequences may include: receiving information of the access probability of the random access sequences from the base station.

The selecting of the random access slot may include receiving load information of a system from the base station, and the selecting of the random access sequences may include selecting random access sequences having priority higher than the UE priority using a probability which is in inverse proportion to the system load.

Advantageous Effects

According to embodiments of the present invention, the present invention minimizes a UE access delay time requesting emergency communication by assigning priority to resources, and is able to reduce an amount of wasted resources by effectively distributing resources to not only a high-priority UE but also a low-priority UE according to individual situations.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The following embodiments of the present invention may be modified into various formats, and the scope of the present invention is not limited to only the following embodiments and can also be applied to other examples.

Figure 1:
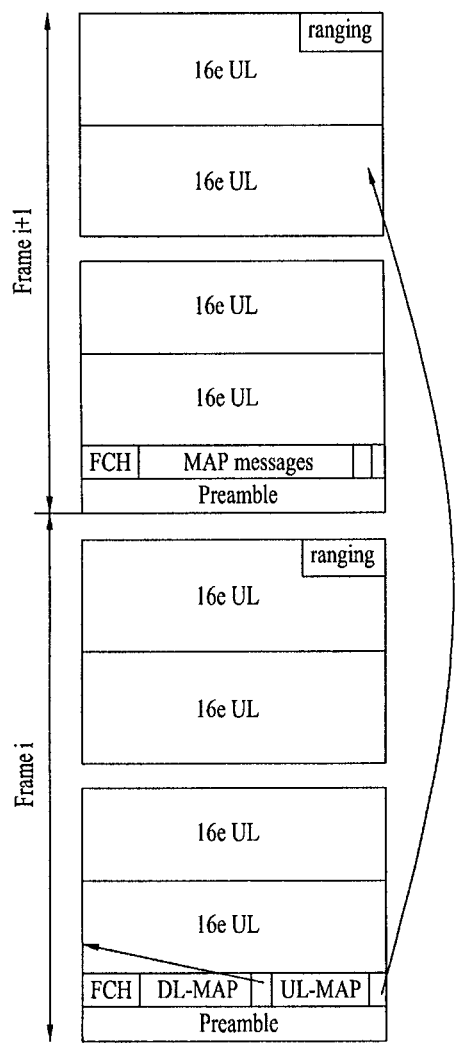
FIG. 1 is a structural diagram illustrating a ranging channel of an IEEE 802.16.
Figure 2:
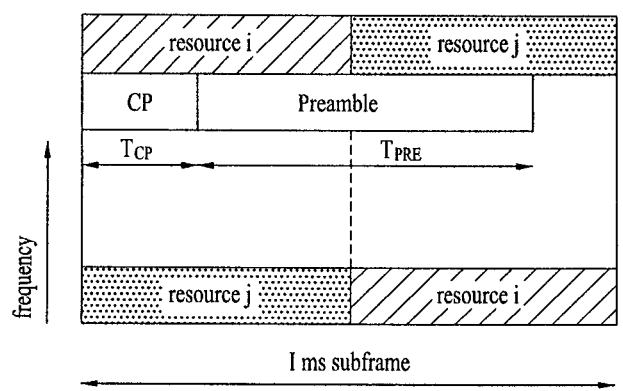
FIG. 2 is a structural diagram illustrating a random access channel of a 3GPP LTE.

FIG. 1 is a structural diagram illustrating an IEEE 802.16 ranging channel. FIG. 2 is a structural diagram illustrating a 3GPP LTE random access channel.

The above-mentioned channels can be equally applied to a UE which performs an initial access regardless of usages. If an amount of user traffic increases, a frequency of such ranging channel also increases due to the increased user traffic. That is, a scheduling process capable of allowing more ranging channels to appear on a frequency axis or a time axis may be carried out.

However, if a system bandwidth is narrow, the importance of resources used for a random access among a total amount of resources increases, such that an amount of traffic resources for total communication is decreased. That is, a throughput is unavoidably deteriorated. Therefore, an amount of resources for the random access increases until reaching system load of a predetermined level, but there is a limitation in increasing the resources. As a result, due to these limited resources, an initial random access based on priority is also limited.

In order to perform the initial random access operation based on priority, a special device is needed. For this operation, a variety of methods can be considered, for example, a method of selecting a random access channel according to priority or system load, a method of using some sequences of all sequences for the random access as a high-priority UE usage, a method for designing a new random access channel, and so on. If a variety of ranging channels are defined as prescribed in the IEEE 802.16, the defined ranging channels can be applied to individual ranging channels.

One embodiment of the present invention is able to determine priority of several random access slots according to a predetermined scheme. That is, this embodiment is able to decide the priority of all random access slots, such that a UE can gain access to all of the random access slots. For example, it is assumed that there are priorities A and B, and the B priority is higher than the A priority. Under this assumption, if the A priority is assigned to a specific random access slot, the access to only a UE having the A priority is allowed. If the B priority is assigned to another random access slot, the access to only a UE having the B priority is allowed or the access to all UEs having the A and B priorities is allowed. As the number of defined priorities increases, a variety of priorities can be established in several slots. Provided that different priorities are allocated to respective slots, a latency time on a random access slot capable of being used by a UE may be changed to another latency time. Accordingly, in order to reduce a latency time of a specific part, many more channels may occur on a frequency axis at the same time position, or many more ranging channels may occur on a time axis at the same time position.

Figure 3:
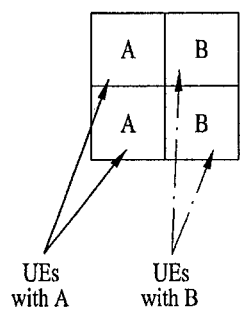
FIGS. 3 and 4 show exemplary priority-based random access methods if priority between a UE and a slot is represented by a one-to-one matching according to one embodiment of the present invention.
Figure 4:
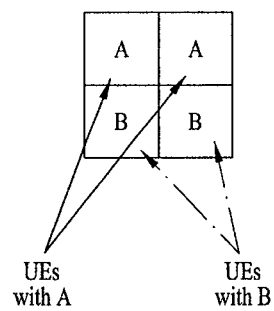

FIGS. 3 and 4 show exemplary priority-based random access methods if priority between a UE and a slot is represented by a one-to-one matching according to one embodiment of the present invention.

In FIGS. 3 and 4, individual slots have priority 'A' or 'B', and the relationship between priority of each UE and another priority of a slot is represented by a one-to-one matching. In this case, one UE having the A priority is able to access only a slot having the A priority, and the other UE having the B priority is able to access only another slot having the B priority.

Figure 5:
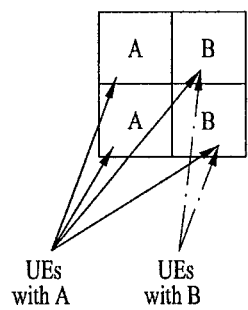
FIGS. 5 and 6 show exemplary priority-based random access methods if priority between a UE and a slot is represented by a one-to-multiple matching according to the present invention.
Figure 6:
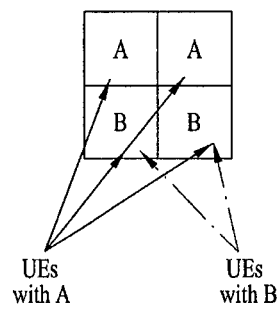

FIGS. 5 and 6 show exemplary priority-based random access methods if priority between a UE and a slot is represented by a one-to-multiple matching according to the present invention.

In FIGS. 5 and 6, the relationship between the priority of each UE and the other priority of each slot is represented by a one-to-multiple matching. The access of the UE having the A priority is allowed via a slot having the A or B priority. However, the access of another UE having the B priority is allowed via only a slot having the B priority.

After the random access slot is selected, the UE selects an arbitrary sequence. Therefore, this UE transmits the selected sequence to a base station via an optimum random access slot.

However, if a specific priority is assigned to all the ranging slots, resources may be unexpectedly wasted according to traffic load of each random access channel.

In order to effectively use resources, another embodiment of the present invention decides a use range of sequences to be used in a random access channel in consideration of UE priority and system load. For example, if the number of sequences available for the random access is N, only the UE having the A priority is able to use M_A sequences among the N sequences, a UE having the B or A priority is able to use the next M_B sequences, and a UE having the C, A, or B priority is able to use the last M_C sequences. In this case, a system is able to provide an opportunity of a random access according to the UE priority, irrespective of system load. Three sequences capable of being used in a random access channel are differently defined, such that different code types (i.e., three codes) can be used according to the priority information, and a high-priority UE is able to use superior sequences having a high spreading gain and correlation characteristics.

Figure 7:
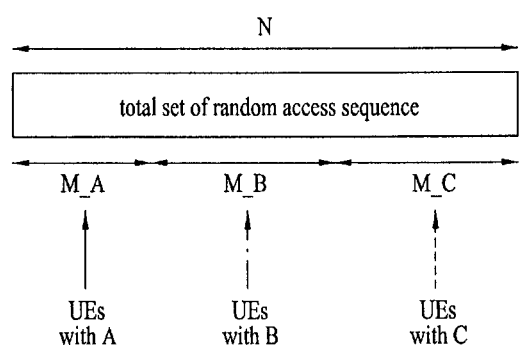
FIG. 7 is a conceptual diagram illustrating an exemplary priority-based random access method if priority between a UE and a sequence is represented by a one-to-one matching according to another embodiment of the present invention.

FIG. 7 is a conceptual diagram illustrating an exemplary priority-based random access method if priority between a UE and a sequence is represented by a one-to-one matching according to another embodiment of the present invention.

Referring to FIG. 7, an overall sequence has any one of A, B, or C priority, and the relationship between UE priority and slot priority is represented by a one-to-one matching. In this case, a UE having the A priority is able to access only a sequence having the A priority, a UE having the B priority is able to access only a sequence having the B priority, and a UE having the C priority is able to access only a sequence having the C priority.

Figure 8:
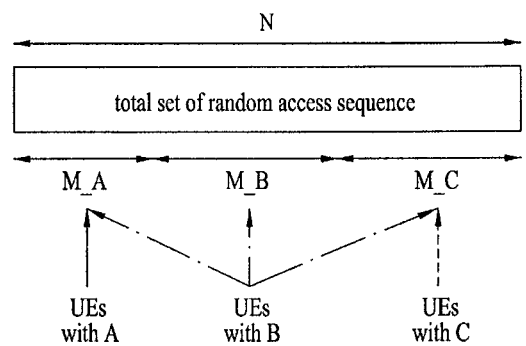
FIG. 8 is a conceptual diagram illustrating an exemplary priority-based random access method if priority between a UE and a sequence is represented by a one-to-multiple matching according to another embodiment of the present invention.

FIG. 8 is a conceptual diagram illustrating an exemplary priority-based random access method if priority between a UE and a sequence is represented by a one-to-multiple matching according to another embodiment of the present invention.

Referring to FIG. 8, the access of a UE having the B priority is allowed via the sequence having the A, B or C priority. However, the access of a UE having the A priority is allowed via only the sequence having the A priority, and the access of a UE having the C priority is allowed via only the sequence having the C priority.

In this case, a total length 'N' represents only the number of all sequences. It should be noted that construction of all sequences does not limit the present invention, and can also be applied to other examples as necessary.

After a random access slot is selected, the UE selects an optimum sequence as described above. Therefore, the UE transmits the optimum sequence to the base station via the random access slot.

Preferably, a new random access channel may be generated. That is, if it is impossible to provide priority and strong accessibility using a conventional structure, a newly-designed channel can sufficiently provide a low collision rate and a processing gain in a different way from a conventional channel. In other words, the length of a random access channel may be further increased on a time axis, or the number of specific sequences having low cross-correlation may be limited. Herein, each specific sequence serves as an orthogonal sequence, and has superior auto-correlation characteristics. Also, in order to implement an optimum performance, the number of sequences may be limited. Specifically, a preamble may be repeated or a longer sequence may be used, such that the increasing of the random access channel length on the time axis may increase a sum of transmission energy.

According to the above-mentioned schemes, a probability of enabling the UE to select a specific slot or a specific sequence according to priority of the UE itself becomes '1' or '0'. However, if these values are defined as ON/OFF operations by an actual system and are carried out by the ON/OFF operations, an unbalance may occur in the amount of used resources according to a load condition. Specifically, a use frequency of a channel/sequence having a high priority is unavoidably lowered. Therefore, provided that the UEs having ordinary priority are designed not to access the high-priority channel/sequence, the prohibition of the UEs accessing operations may be considered to be a waste of resources.

According to yet another embodiment of the present invention, when individual UEs access slots having different priorities or sequences having different priorities in order to effectively use resources, the UEs may access or select the slots or sequences using a constant probability. Also, if a corresponding probability distribution is changed to another according to practical uses of resources having priority, an amount of wasted resources can be effectively reduced. In this case, the base station (BS) is able to establish a format of the above stochastic access/selection scheme.

For example, the probability of allowing a UE having the B priority to select a slot/sequence having the A priority is as follows. If load is in a very high status, i.e., if a utility of resources having the A priority is very close to 100%, this probability may be set to '0'. If the load is in a middle status, this probability may be set to '0.3'. If the load is in a low status, this probability may be set to '0.6'. As a result, low-priority UEs can also use different resources. The base station (BS) transfers at least one of load information and access probability information to each UE according to a system load situation.

If the UE stochastically gains access to resources, a probability value indicates a kind of priority, such that the base station (BS) need not transfer priority information of each random access resource to the UE. The base station (BS) classifies resources to which the stochastic access is applied, defines the classified resources, and transfers a probability value of the defined resource classification to the UE. Therefore, the UE is able to use each random access resource according to its priority or probability.

Figure 9:
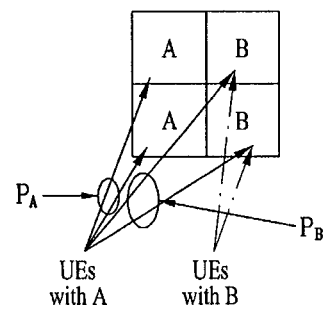
FIG. 9 is a conceptual diagram illustrating an exemplary priority-based random access method if priority between a UE and a sequence is represented by a one-to-one matching according to yet another embodiment of the present invention.

FIG. 9 is a conceptual diagram illustrating an exemplary priority-based random access method if priority between a UE and a sequence is represented by a one-to-one matching according to yet another embodiment of the present invention.

In FIG. 9, each UE having the A priority has $P_A$ and $P_B$ probabilities, and determines whether to use the slot having the A priority or the other slot having the B priority. In this way, provided that the probability value applied to a specific UE is represented by two probability values, if the UE recognizes only one of two probability values, the other probability value can be calculated by an equation '$P_B=1-P_A$'.

Figure 10:
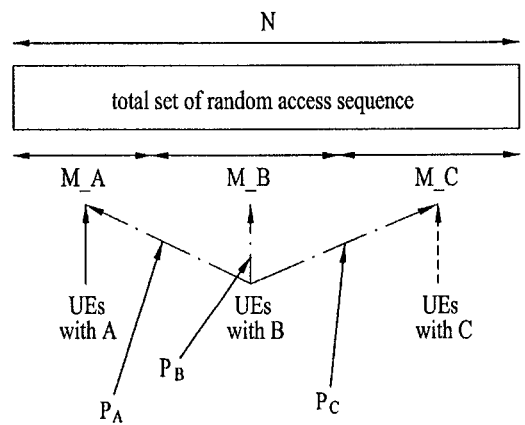
FIG. 10 is a conceptual diagram illustrating an exemplary priority-based random access method if priority between a UE and a sequence is represented by a one-to-multiple matching according to yet another embodiment of the present invention.

FIG. 10 is a conceptual diagram illustrating an exemplary priority-based random access method if priority between a UE and a sequence is represented by a one-to-multiple matching according to yet another embodiment of the present invention.

In FIG. 10, each UE having the B priority has $P_A$, $P_B$ and $P_C$ probabilities, and determine whether to use a sequence having the A priority, a sequence having the B priority, or a sequence having the C priority. In this way, provided that the probability value becomes '0', this probability of '0' indicates that a corresponding area cannot be actually used.

When random access resources are supported, each base station must transfer reservation information of high-priority resources to the UE. In more detail, a random access slot setup may be represented in the form of a sequence in broadcast information indicating a system configuration, and the sequence-formatted result may be transferred to the UE. The slot indicator and the priority information can be simultaneously encoded, and the encoded result may be transferred to the UE.

When the UE performs a stochastic access, it is preferable that probability information may also be transferred to UEs. For this purpose, the base station encodes a direct probability value together with either the sequence or the random access slot information, and transfers the encoded result. In this case, the probability value may be a direct UE's access probability value or an indexed value of the probability.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

INDUSTRIAL APPLICABILITY

As apparent from the above description, the present invention relates to a priority-based random access method, which minimizes a UE access delay time requesting emergency communication, and at the same time prevents resources from being wasted, such that it can be applied to a variety of devices such as an IEEE 802.16 or 3GPP LTE system supporting a random access.

The invention claimed is:

1. A priority-based random access method for use in a random access method supporting emergency communication comprising:
   selecting, by a user equipment (UE), an arbitrary random access slot among several random access slots;
   selecting one or more random access sequences corresponding to priority of the UE, among a plurality of random access sequences to which at least two priorities are allocated; and
   transferring the selected one or more sequences to a base station via the selected random access slot,
   wherein the selecting of the one or more random access sequences includes selecting the one or more random access sequences which have higher priority in proportion to the UE priority,
   wherein the selecting of the one or more random access sequences includes selecting the one or more random access sequences having priority lower than the UE priority, when the one or more random access sequences corresponding to the UE priority are selected by another UE.

2. The method according to claim 1, wherein priority information allocated to the one or more random access sequences is stored as an initial value in the UE.

3. The method according to claim 1, wherein the several random access slots have a preamble repetition structure.

4. A priority-based random access method for use in a random access method supporting emergency communication comprising:
   selecting, by a user equipment (UE), a random access slot corresponding to priority of the UE by using a probability of accessing several random access slots to which at least two priorities are allocated;
   selecting an arbitrary sequence by the UE; and
   transferring the selected sequence to a base station via the selected random access slot, wherein the selecting of the random access slot includes:

receiving load information of a system from the base station; and selecting the random access slot having priority higher than the UE priority by using said probability which is in inverse proportion to a system load obtained from the load information of the system.

5. The method according to claim 4, wherein the selecting of the random access slot includes: receiving information of the access probability of the random access slots from the base station.

6. A priority-based random access method for use in a random access method supporting emergency communication comprising:

selecting, by a user equipment (UE), an arbitrary random access slot among several random access slots;

selecting one or more random access sequences corresponding to priority of the UE by using a probability of accessing a plurality of random access sequences to which at least two priorities are allocated; and transferring the selected one or more sequences to a base station via the selected random access slot, wherein the selecting of the one or more random access sequences includes receiving load information of a system from the base station, and wherein the selecting of the one or more random access sequences includes selecting the one or more random access sequences having priority higher than the UE priority by using said probability which is in inverse proportion to a system load obtained from the load information of the system.

7. The method according to claim 6, wherein the selecting of the one or more random access sequences includes:

receiving information of the probability of accessing the plurality of random access sequences from the base station.

* * * * *